United States Patent
Allen et al.

(10) Patent No.: US 9,399,859 B2
(45) Date of Patent: Jul. 26, 2016

(54) MAGNETIC COUPLING FOR FAUCET HANDLE

(71) Applicant: Masco Corporation of Indiana, Indianapolis, IN (US)

(72) Inventors: Benjamin Michael Allen, Indianapolis, IN (US); Alfred Charles Nelson, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 374 days.

(21) Appl. No.: 14/041,035

(22) Filed: Sep. 30, 2013

(65) Prior Publication Data

US 2014/0090718 A1    Apr. 3, 2014

Related U.S. Application Data (63) Continuation of application No. 12/651,818, filed on Jan. 4, 2010, now Pat. No. 8,567,430, which is a continuation-in-part of application No. 12/609,489, filed on Oct. 30, 2009, now Pat. No. 8,627,844.

(51) Int. Cl.
*E03C 1/04*    (2006.01)
*F16K 31/60*    (2006.01)

(52) U.S. Cl.
CPC ............ *E03C 1/0412* (2013.01); *F16K 31/602* (2013.01); *F16K 31/605* (2013.01); *Y10T 16/469* (2015.01); *Y10T 137/0402* (2015.04); *Y10T 137/598* (2015.04); *Y10T 137/6024* (2015.04); *Y10T 137/6977* (2015.04)

(58) Field of Classification Search
CPC .... F16K 31/602; F16K 31/605; E03C 1/0412
USPC ..................................... 403/DIG. 1; 251/292
See application file for complete search history.

(56) References Cited

U.S. PATENT DOCUMENTS

| | | | |
|---|---|---|---|
| 2,623,256 | A | 12/1952 | Feibelman |
| 2,697,642 | A | 12/1954 | Jerome |
| 3,181,895 | A | 5/1965 | Cator |

(Continued)

FOREIGN PATENT DOCUMENTS

| | | |
|---|---|---|
| JP | 2000-263060 | 9/2000 |
| JP | 2002-068270 | 3/2002 |
| JP | 2002-223969 | 8/2002 |

OTHER PUBLICATIONS

Grohe Product Catalog pages, "Stainless Steel Pull-Out Spray," 33 755, 2004, 4 pages.

(Continued)

*Primary Examiner* — Kevin Murphy
(74) *Attorney, Agent, or Firm* — Faegre Baker Daniels LLP (57) ABSTRACT

A fluid delivery device including a body having at least one waterway, a valve assembly in fluid communication with the at least one waterway, the valve assembly including a movable valve member configured to control the flow of water through the at least one waterway and a stem operably coupled to the moveable valve member for movement therewith, and a handle coupled to the stem for movement therewith. A magnetically attractive element is supported by one of the handle and the stem, and at least one magnet is supported by the other of the handle and the stem that is configured to magnetically attract the magnetically attractive element to couple the handle to the stem.

22 Claims, 8 Drawing Sheets

(56) References Cited

U.S. PATENT DOCUMENTS

| | | | |
|---|---|---|---|
| 3,789,870 A | 2/1974 | Keller, III | |
| 3,840,041 A | 10/1974 | McMurray | |
| 4,205,678 A | 6/1980 | Adair | |
| 4,231,137 A | 11/1980 | Fujimoto | |
| 4,232,695 A | 11/1980 | Roberge | |
| 4,304,256 A | 12/1981 | Taiani | |
| 4,384,703 A | 5/1983 | Ruyak et al. | |
| 4,427,960 A | 1/1984 | Wuerfel | |
| 4,502,165 A | 3/1985 | Szemeredi et al. | |
| 4,671,486 A | 6/1987 | Giannini | |
| 4,716,922 A | 1/1988 | Camp | |
| 4,718,131 A | 1/1988 | Kitamura et al. | |
| 4,989,278 A | 2/1991 | Kostorz | |
| 4,989,633 A | 2/1991 | Humpert et al. | |
| 5,096,230 A | 3/1992 | Pausch et al. | |
| 5,419,354 A | 5/1995 | Krynicki | |
| 5,645,302 A | 7/1997 | Horimoto | |
| 5,669,407 A * | 9/1997 | Bailey | 137/359 |
| 5,727,769 A | 3/1998 | Suzuki | |
| 5,771,884 A * | 6/1998 | Yarnall et al. | 128/205.24 |
| 5,771,934 A | 6/1998 | Warshawsky | |
| 6,023,951 A | 2/2000 | Maurer et al. | |
| 6,387,096 B1 | 5/2002 | Hyde, Jr. | |
| 6,718,569 B2 | 4/2004 | Burger et al. | |
| 6,757,921 B2 | 7/2004 | Esche | |
| 6,786,239 B1 | 9/2004 | Welsh | |
| 6,845,526 B2 | 1/2005 | Malek et al. | |
| 6,877,172 B2 | 4/2005 | Malek et al. | |
| 6,910,604 B2 | 6/2005 | Gugliotti et al. | |
| 6,938,837 B2 | 9/2005 | Nelson et al. | |
| 7,077,150 B2 | 7/2006 | McNerney | |
| 7,114,510 B2 | 10/2006 | Peters et al. | |
| 7,162,802 B2 | 1/2007 | Benardeau et al. | |
| 7,246,757 B2 | 7/2007 | Juo | |
| 7,520,105 B2 | 4/2009 | Geller | |
| 7,537,023 B2 | 5/2009 | Marty et al. | |
| 8,567,430 B2 * | 10/2013 | Allen et al. | 137/315.15 |
| 2003/0012985 A1 * | 1/2003 | McAlister | 429/12 |
| 2003/0188381 A1 | 10/2003 | Bosio | |
| 2004/0010848 A1 | 1/2004 | Esche | |
| 2004/0135009 A1 | 7/2004 | Malek et al. | |
| 2004/0144866 A1 | 7/2004 | Nelson | |
| 2004/0177880 A1 | 9/2004 | Nelson | |
| 2004/0254533 A1 | 12/2004 | Schriver et al. | |
| 2005/0028890 A1 | 2/2005 | Sakaki et al. | |
| 2005/0052018 A1 | 3/2005 | Pichotta | |
| 2006/0130907 A1 | 6/2006 | Marty et al. | |
| 2006/0213585 A1 | 9/2006 | Nakamura et al. | |
| 2006/0283511 A1 | 12/2006 | Nelson | |
| 2007/0001018 A1 | 1/2007 | Schmitt et al. | |
| 2007/0170284 A1 | 7/2007 | Nelson | |
| 2008/0185060 A1 | 8/2008 | Nelson | |
| 2008/0258854 A1 | 10/2008 | Davis | |
| 2008/0283083 A1 | 11/2008 | Piao | |

OTHER PUBLICATIONS

Latoscana Elba Kitchen Faucet With Magnetic Spray, Model 78CR557PMEX, retrieved from www.thehomedepot.com, prior to May 3, 2007, 2 pgs.

Latoscana Elba Kitchen Faucet With Magnetic Spray, Brushed Nickel Finish, Model 78PW557PMEX, retrieved from www.thehomedepot.com, prior to May 3, 2007, 2 pgs.

Latoscana Elba Kitchen Faucet With Magnetic Spray, Model 78CR557M, Design Specifications, retrieved from www.latoscanacollection.com, prior to May 3, 2007, 3 pgs.

International Search Report and Written Opinion of the International Searching Authority for Application No. PCT/US2011/020031, mailed Jun. 2, 2011, 12 pgs.

* cited by examiner

MAGNETIC COUPLING FOR FAUCET HANDLE

CROSS-REFERENCE TO RELATED APPLICATION

This application is a continuation of U.S. patent application Ser. No. 12/651,818, entitled MAGNETIC COUPLING FOR FAUCET HANDLE, filed Jan. 4, 2012, which is a continuation-in-part of U.S. patent application Ser. No. 12/609,489, entitled MAGNETIC ESCUTCHEON MOUNTING ASSEMBLY, filed Oct. 30, 2009, the disclosures of which are expressly incorporated by reference herein in their entirety.

BACKGROUND AND SUMMARY OF THE INVENTION

The present invention relates generally to plumbing fixtures and, more particularly, to a magnetic coupling for plumbing fixtures.

Faucets may include one or more handles for controlling the flow rate and temperature of an outlet water stream delivered from a spout. Traditional two-handle faucets may include one handle that controls the flow of hot water in the outlet stream and another handle that controls the flow of cold water in the outlet stream. Single-handle faucets, on the other hand, typically include a single handle that controls both the temperature of the outlet stream and the flow rate of the outlet stream. The single handle is movable in distinct directions to adjust the total amount and relative proportions of hot and cold water in the outlet stream.

According to an illustrative embodiment of the present disclosure, a fluid delivery device includes a body including at least one waterway, a valve assembly in fluid communication with the at least one waterway, the valve assembly including a movable valve member configured to control the flow of water through the at least one waterway and a stem operably coupled to the moveable valve member for movement therewith, the stem having a longitudinal axis, and a handle operably coupled to the stem for movement therewith. The fluid delivery device further includes a magnetically attractive element supported by one of the handle and the stem and at least one magnet supported by the other of the handle and the stem that is configured to magnetically attract the magnetically attractive element to couple the handle to the stem, the at least one magnet interfacing the magnetically attractive element along an interface plane that extends substantially perpendicular to the longitudinal axis of the stem.

According to another illustrative embodiment of the present disclosure, a fluid delivery device includes a body including at least one waterway, a valve assembly in fluid communication with the at least one waterway, the valve assembly including a movable valve member configured to control the flow of water through the at least one waterway and a stem operably coupled to the moveable valve member for movement therewith, the stem having a longitudinal axis. The fluid delivery device further includes a handle operably coupled to the stem for movement therewith under a magnetic coupling force, the magnetic coupling force between the handle and the stem oriented in a direction substantially parallel to the longitudinal axis of the stem.

According to yet another illustrative embodiment of the present disclosure, a method is provided for adjusting a fluid delivery device. The method includes the step of providing a fluid delivery device including a body having at least one waterway, a handle, and a valve assembly in fluid communication with the at least one waterway, the valve assembly including a moveable valve member and a stem operably coupled to the moveable valve member and to the handle for movement therewith. The method also includes the steps of adjusting the handle to move the stem, the stem actuating the moveable valve member to control the flow of water through the at least one waterway, and removing the handle from the stem by sliding the handle in a direction substantially perpendicular to a longitudinal axis of the stem with sufficient force to overcome a magnetic coupling force between the handle and the stem.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

With reference to FIGS. 1-4, an illustrative embodiment faucet 10 is provided. Faucet 10 illustratively includes body 11 having base 12 and spout 14, a single handle 16, and a single valve assembly 18. Faucet 10 is configured to fluidly couple to hot and cold water supplies (not shown).

Figure 4:
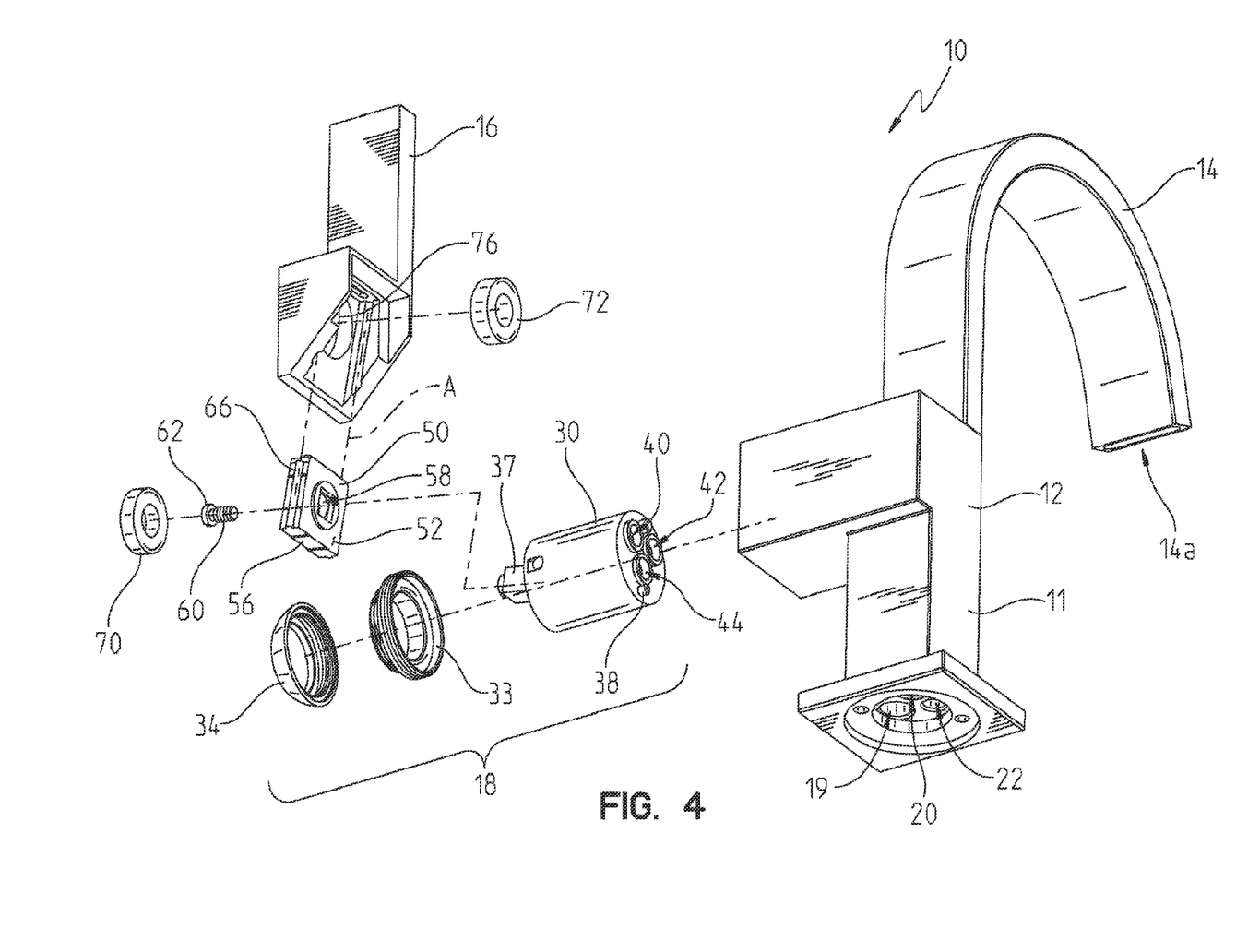
FIG. 4 is a rear exploded perspective view of the faucet of FIG. 1.

In operation, a user manipulates handle 16 of faucet 10 to select a desired fluid temperature and fluid flow rate. Base 12 of faucet 10 receives hot and cold water streams from the hot and cold water supplies, valve assembly 18 of faucet 10 mixes the hot and cold water streams based on the position of handle 16 to produce an outlet water stream, and spout 14 of faucet 10 delivers the outlet water stream into a sink basin (not shown) or a tub (not shown), for example. As shown in FIG. 4, base 12 of faucet 10 defines mounting hole 19 that is configured to receive a mounting shank (not shown) to couple faucet 10 to a horizontal surface of the sink deck or the tub deck.

Figure 2:
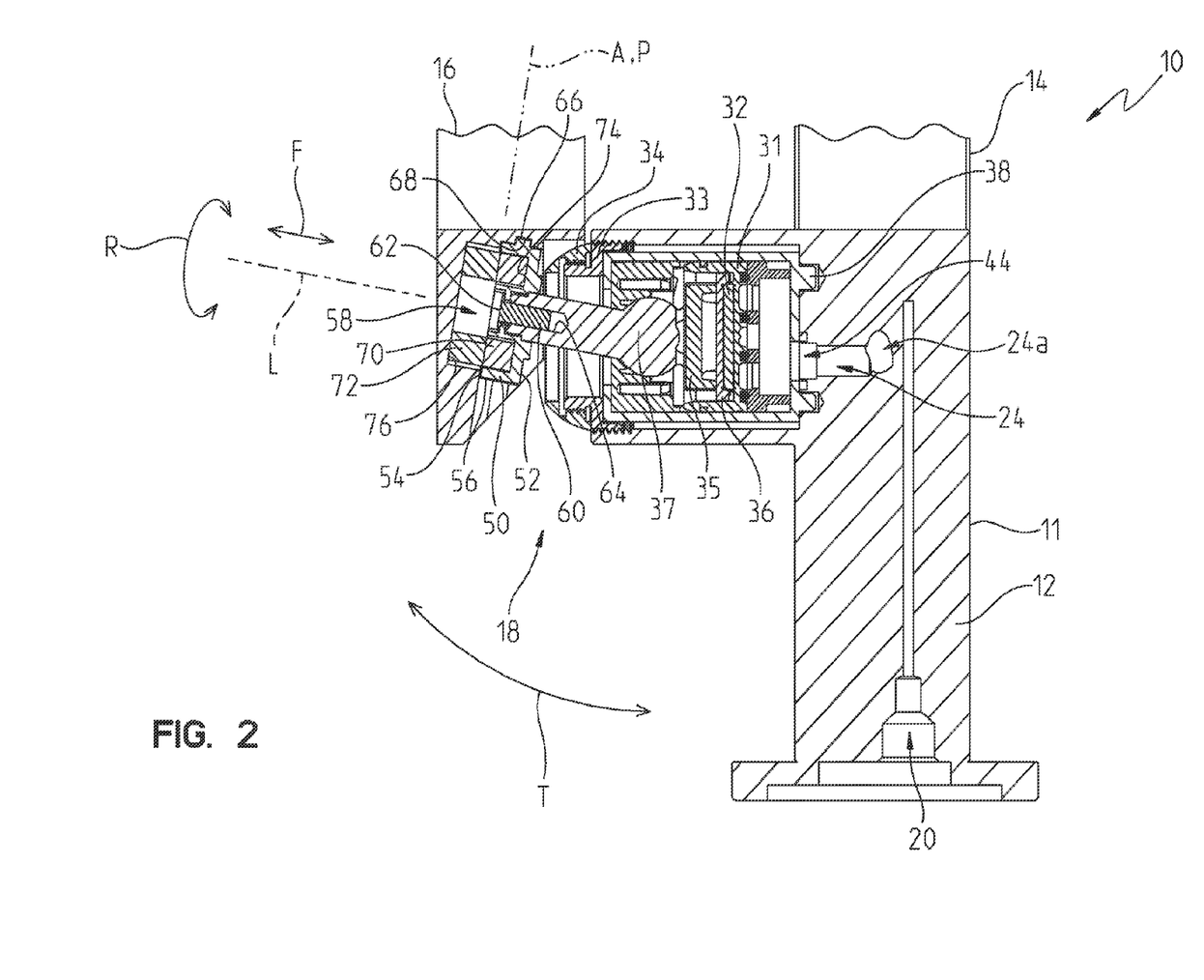
FIG. 2 is a cross-sectional view of a portion of the faucet of FIG. 1, taken along line 2-2 of FIG. 1.

Base 12 of the illustrative faucet 10 includes hot water inlet chamber 20 (FIG. 4), cold water inlet chamber 22 (FIG. 4), and outlet chamber 24 (FIG. 2). Hot water inlet chamber 20 of base 12 is in fluid communication with the hot water supply (not shown), and cold water inlet chamber 22 of base 12 is in fluid communication with the cold water supply (not shown). In operation, the hot and cold water inlet chambers 20, 22, of base 12 receive and deliver hot and cold water streams to valve assembly 18 for mixing.

Figure 3:
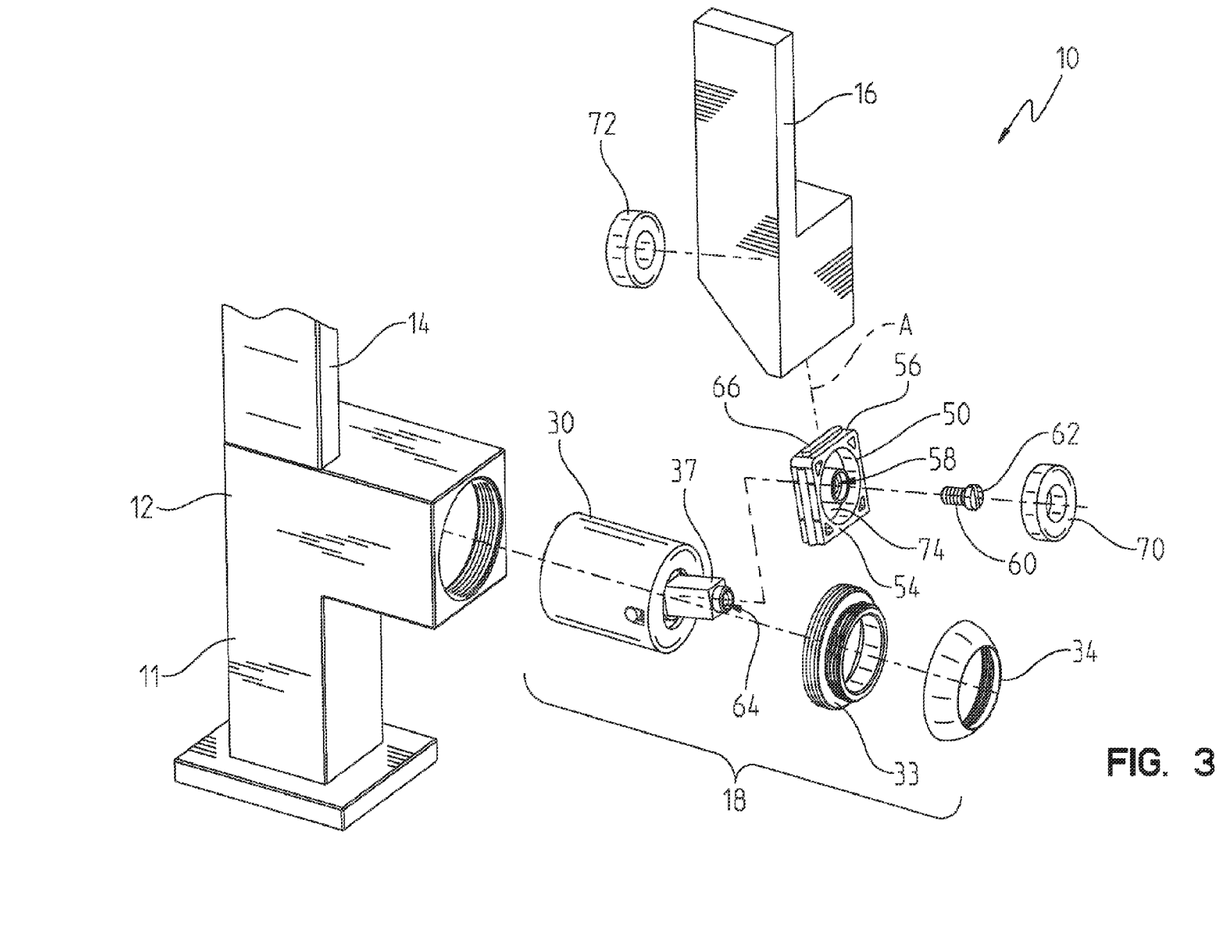
FIG. 3 is a front exploded perspective view of a portion of the faucet of FIG. 1.

As shown in FIGS. 2-4, valve assembly 18 of the illustrative faucet 10 includes valve body 30, base 31, gasket 32, nut 33, and bonnet 34. Valve assembly 18 also includes a moveable valve member, illustratively moveable disc 35, and a stationary valve member, illustratively stationary disc 36. It is also within the scope of the present disclosure that the moveable valve member may include a moveable ball or another suitable component that moves relative to the stationary valve member to control the flow of fluid through valve assembly 18. Valve assembly 18 also includes stem 37 that is operably coupled to moveable disc 35.

Valve assembly 18 is supported by base 12. To secure valve assembly 18 to base 12, nut 33 threadably engages base 12 and bonnet 34 surrounds and threadably engages nut 33, as shown in FIG. 2. To help locate and prevent valve assembly 18 from rotating or shifting within base 12, the illustrative valve assembly 18 includes pegs 38 that extend into base 12.

Valve assembly 18 of the illustrative faucet 10 further includes hot water inlet port 40, cold water inlet port 42, and outlet port 44, as shown in FIG. 4. When valve assembly 18 is secured to base 12, hot water inlet port 40 of valve assembly 18 is in fluid communication with hot water inlet chamber 20 of base 12, cold water inlet port 42 of valve assembly 18 is in fluid communication with cold water inlet chamber 22 of base 12, and outlet port 44 of valve assembly 18 is in fluid communication with outlet chamber 24 of base 12. As shown in FIG. 2, outlet chamber 24 of base 12 may split into first portion 24a that extends upward to communicate with spout 14 (FIG. 2) and a second portion (not shown) that extends downward through base 12 to communicate with an auxiliary fluid dispensing device, such as a side sprayer (not shown).

Figure 1:
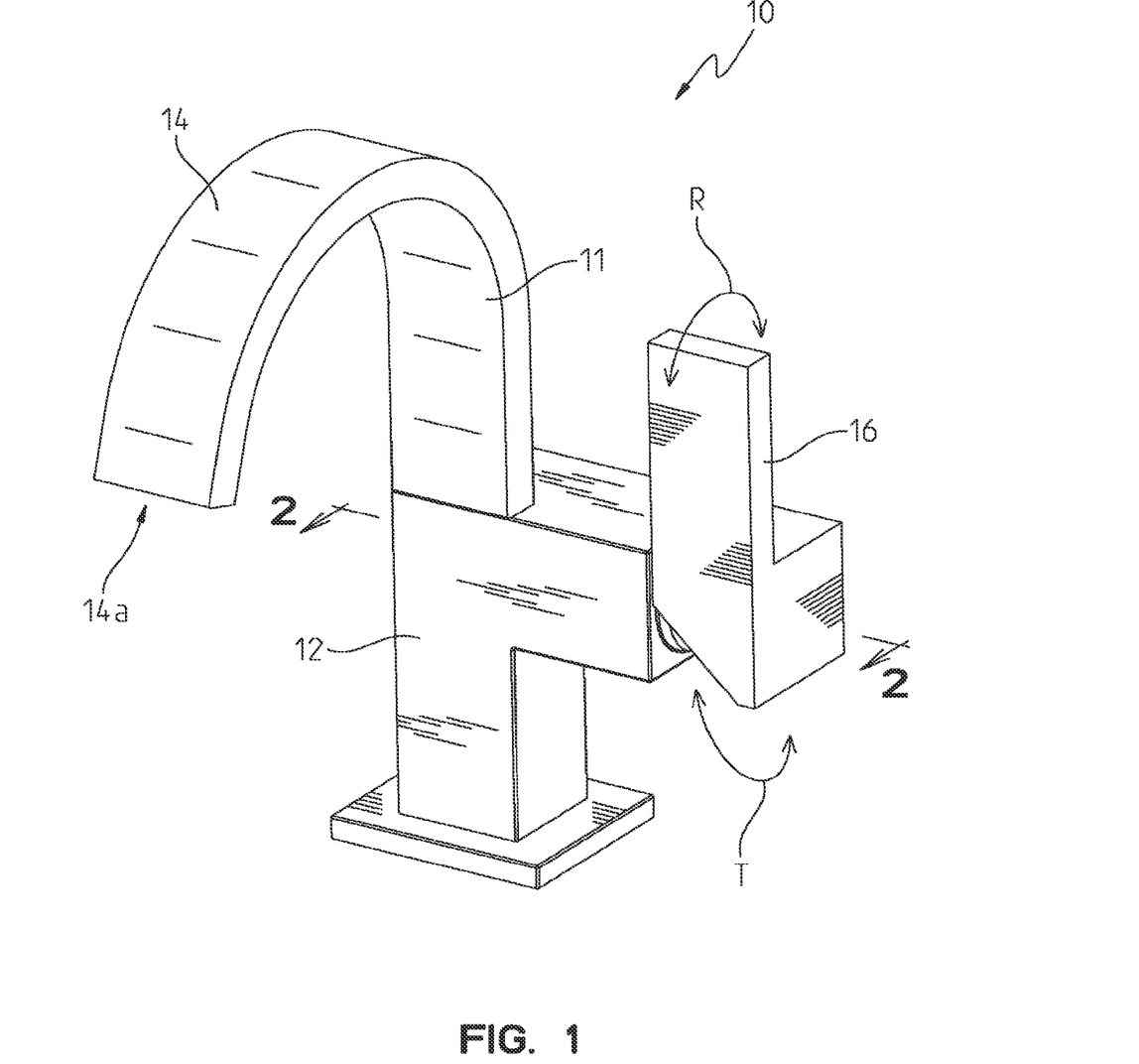
FIG. 1 is a perspective view of an illustrative embodiment faucet of the present disclosure.

Handle 16 of the illustrative faucet 10 is coupled to stem 37 of valve assembly 18 for movement therewith. As shown in FIG. 1, handle 16 may be configured to rotate stem 37 about a first axis in the direction of arrow R, as well as tilt or pivot stem 37 about a second axis perpendicular to the first axis in the direction of arrow T. In use, moving handle 16 of faucet 10 relative to base 12 actuates stem 37 of valve assembly 18, which moves moveable disc 35 relative to stationary disc 36 to control the mixing of hot and cold water and the flow rate of water through valve assembly 18. Therefore, by adjusting handle 16 of faucet 10, a user is able to selectively vary the temperature and flow rate of water supplied from hot and cold water inlet ports 40, 42, to outlet port 44 of valve assembly 18. Because outlet port 44 of valve assembly 18 is in fluid communication with outlet chamber 24 of base 12, adjusting handle 16 of faucet 10 allows the user to selectively vary the temperature and flow rate of water supplied to outlet chamber 24 of base 12. Faucet 10 may include a diverter valve (not shown) that controls whether the outlet water stream travels through first portion 24a of outlet chamber 24 to be dispensed from outlet end 14a of spout 14 (FIG. 1), and/or whether the outlet water stream travels through the second portion (not shown) of outlet chamber 24 to be dispensed from an auxiliary side sprayer (not shown), for example.

According to an exemplary embodiment of the present disclosure, handle 16 is removably coupled to stem 37 of valve assembly 18. Handle 16 may be removed from valve assembly 18 to adjust, clean, replace, or repair the components, for example.

To removably couple handle 16 to stem 37 of valve assembly 18, the illustrative faucet 10 includes bracket 50. As shown in FIGS. 2-4, bracket 50 includes first surface 52 that faces valve assembly 18, second surface 54 that faces handle 16, and a square-shaped outer periphery 56 or any other shape with the ability to translate torque, such as a spline.

Bracket 50 includes central aperture 58 that is sized and shaped to receive stem 37 of valve assembly 18. An exemplary central aperture 58 of bracket 50 is non-circular in shape to prevent bracket 50 from spinning freely relative to stem 37. For example, central aperture 58 of bracket 50 may be substantially square or rectangular in shape to receive stem 37 of a corresponding shape.

Bracket 50 itself may be removably coupled to valve assembly 18. For example, in the illustrative embodiment of FIGS. 2-4, bracket 50 is removably coupled to stem 37 of valve assembly 18 using screw 60. With head 62 of screw 60 resting against second surface 54 of bracket 50, screw 60 extends through central aperture 58 of bracket 50 and into an internally threaded bore 64 of stem 37 to secure bracket 50 onto stem 37. Because the illustrative bracket 50 is coupled to stem 37 of valve assembly 18 for movement therewith, bracket 50 should be spaced a sufficient distance from bonnet 34 to avoid interfering with movement of stem 37.

As shown in FIGS. 3 and 4, bracket 50 includes a plurality of rails 66 that project from outer periphery 56. As shown in FIG. 2, handle 16 defines corresponding grooves 68 that are configured to receive rails 66. With handle 16 fully seated onto bracket 50, handle 16 may be prevented from moving relative to stem 37 of valve assembly 18, except along axis A. Thus, handle 16 may be removed from valve assembly 18 by pulling handle 16 upward along axis A. According to an exemplary embodiment of the present disclosure, when handle 16 is attached to bracket 50, bracket 50 prevents handle 16 from moving relative to stem 37 under the force of gravity to reduce the likelihood that handle 16 will unintentionally detach from stem 37.

To further secure handle 16 onto stem 37 of valve assembly 18, the illustrative faucet 10 includes at least one magnet and at least one magnetically attractive element. In use, the at least one magnet attracts the at least one magnetically attractive element to couple handle 16 to stem 37 of valve assembly 18 for movement therewith. The magnetically attractive element may itself comprise a magnet, or the magnetically attractive element may be formed of a material that is merely attracted to another magnet. In certain illustrative embodiments, the magnetically attractive element may be formed of iron or steel, such as 410 stainless steel or galvanized steel.

As shown in FIGS. 2-4, the illustrative faucet 10 includes first magnet 70 and second magnet 72. In other words, the at least one magnetically attractive element is itself a magnet. First magnet 70 of the illustrative faucet 10 is coupled to bracket 50, which is in turn coupled to stem 37 of valve assembly 18 for movement therewith. More specifically, first magnet 70 is received within recess 74 of bracket 50, as shown in FIG. 3. Second magnet 72 of the illustrative faucet 10 is coupled to handle 16. More specifically, second magnet 72 is received within recess 76 of handle 16, as shown in FIG. 4.

First and second magnets 70, 72, may be secured in place by a variety of suitable techniques. For example, bracket 50 and/or handle 16 may be manufactured from a magnetically attractable material, such as iron or steel, to hold first and second magnets 70, 72 within their respective recesses 74, 76.

As another example, a fastener or adhesive may be used to secure first and second magnets 70, 72, in place.

When second magnet 72 on handle 16 is positioned proximate to first magnet 70 on stem 37 of valve assembly 18, as shown in FIG. 2, first and second magnets 70, 72, attract one another to magnetically couple handle 16 to stem 37 for movement therewith. In an illustrative embodiment, first and second magnets 70, 72, have an axially facing arrangement. For example, as shown in FIG. 2, first and second magnets 70, 72, interface along plane P that is oriented substantially perpendicular to longitudinal axis L of stem 37. In this illustrative embodiment, magnetic coupling force F between first and second magnets 70, 72, is oriented in a direction parallel to longitudinal axis L of stem 37, as shown in FIG. 2.

According to an exemplary embodiment of the present disclosure, first and second magnets 70, 72, generate a total coupling force of approximately 10 $lb_f$, 20 $lb_f$, 30 $lb_f$, or more. The coupling force should be strong enough to hold handle 16 in place during normal operation of faucet 10. However, the coupling force should be weak enough to allow a user to overcome the force and remove handle 16 from faucet 10 when desired, such as when handle 16 needs to be repaired or replaced. First magnet 70 may be positioned in direct contact with second magnet 72, as shown in FIG. 2, to generate a sufficient coupling force.

First and second magnets 70, 72, may be of any conventional design. As is known, magnets have magnetic fields defined by their strength and orientation. Magnetic poles are regions in the magnet where the field of the magnet is most intense, each of which is likened to a geographic direction, north (N) or south (S). The direction of the magnetic field is the direction of a line that passes through the north (N) and south (S) poles of the magnet. Generally, the direction is perpendicular to the magnetic surface of the magnet. The orientation of the magnetic field is the direction pointed to by the north (N) pole of the magnet.

Magnets with a single magnetic field are considered dipolar because they have two poles: a north (N) pole and a south (S) pole. The magnetic field of dipolar magnets can interact with other magnetic fields to produce a repelling or an attracting force. Also, magnets may interact with magnetically attractive materials, such as iron or steel, that are naturally attracted to magnets.

There are several different types of magnets. A permanent magnet has a constant, or permanent, magnetic field. However, an electromagnet generates a magnetic field only when a flow of electric current passes through it. The strength of an electromagnetic field can be altered by changing the current that flows through the electromagnet. Once the current stops flowing through the material, the magnetic field disappears. The magnetic force of any magnet may be changed by altering the position of the magnet relative to another magnet or attractable material.

First and second magnets 70, 72, may include rare earth magnets. In one illustrative embodiment, first and second magnets 70, 72, are formed from a neodymium magnetic slurry. While first and second magnets 70, 72, of the present embodiment are permanent magnets, it is envisioned that other types of magnets, including electromagnets, could be used.

Figure 2A:
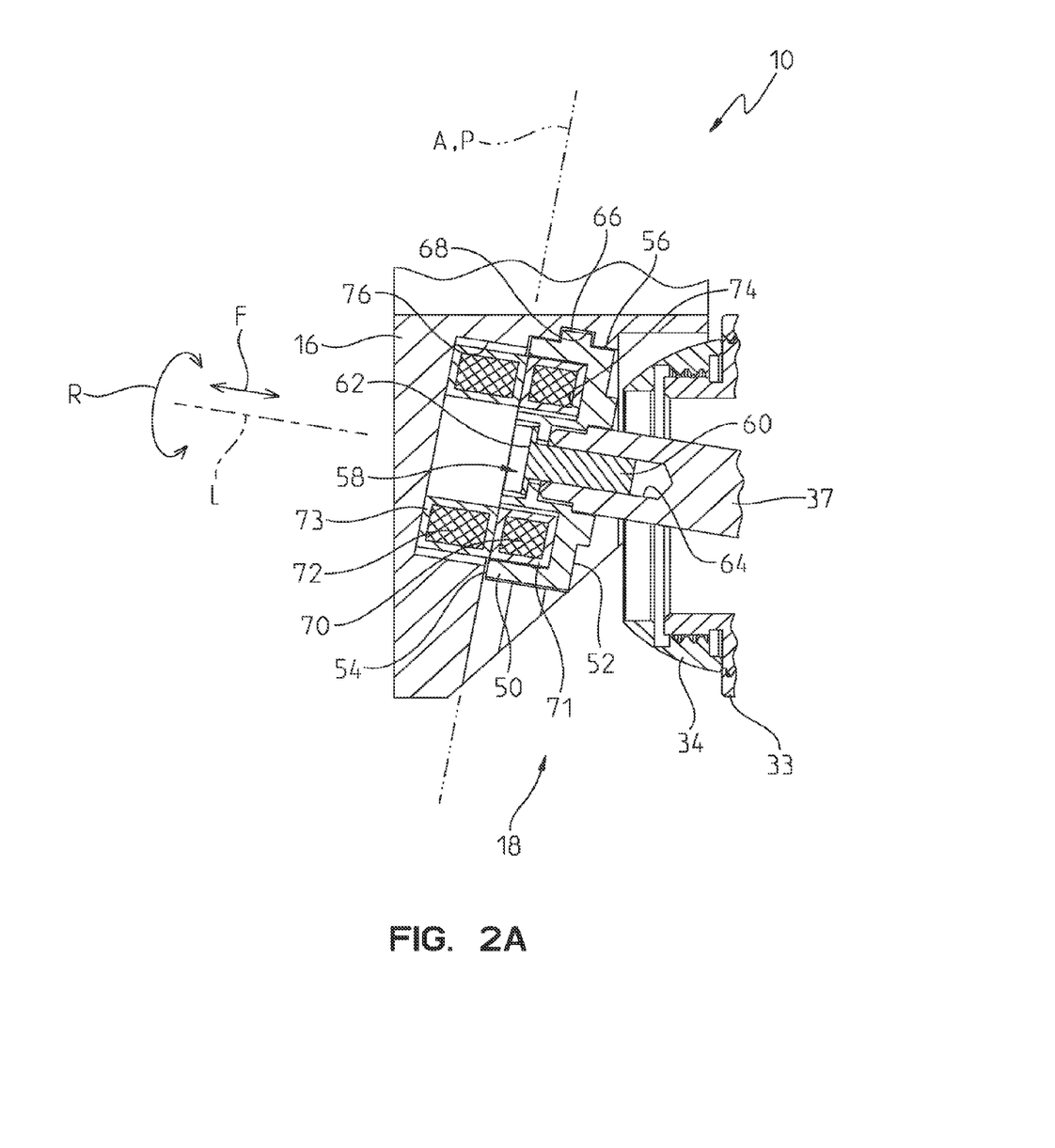
FIG. 2A is another cross-sectional view showing a detailed portion of the faucet of FIG. 2.

First and second magnets 70, 72, may be coated or plated to prevent humidity and wetness from corroding and decreasing the magnetic strength. For example, as shown in FIG. 2A, first magnet 70 includes coating 71 and second magnet 72 includes coating 73. In an illustrative embodiment, each coating 71, 73, of first and second magnets 70, 72, includes an inner-most, first nickel layer, a copper layer on top of the first nickel layer, a second nickel layer on top of the copper layer, and an outer-most, epoxy layer on top of the second nickel layer. In another illustrative embodiment, each coating 71, 73, is formed of a suitable polymer that is overmolded onto first and second magnets 70, 72, respectively.

In the illustrated embodiment of FIGS. 2-4, bracket 50 and first and second magnets 70, 72, cooperate to retain handle 16 in place on stem 37 of valve assembly 18 during normal operation of faucet 10. As discussed above, and as shown in FIG. 4, rails 66 of bracket 50 are received within corresponding grooves 68 of handle 16 to prevent handle 16 from moving relative to stem 37, except along axis A. Furthermore, the magnetic coupling force between first and second magnets 70, 72, resists movement of handle 16 relative to stem 37, even along axis A.

When the user chooses to remove handle 16 from stem 37, the user may pull handle 16 upward along axis A with enough force to overcome the magnetic coupling force between first and second magnets 70, 72. When the user chooses to replace handle 16, the user may push handle 16 downward along axis A until handle 16 is fully seated onto bracket 50 and first and second magnets 70, 72, reconnect. Advantageously, these steps of removing and replacing handle 16 may be completed without the use of tools.

The illustrative faucet 10 of FIG. 1 achieves an attractive exterior appearance that lacks visible fasteners for securing handle 16 onto stem 37 of valve assembly 18. Rather, bracket 50 and first and second magnets 70, 72, of the illustrative faucet 10 are interior components that are hidden from view (see FIG. 2).

Figure 5:
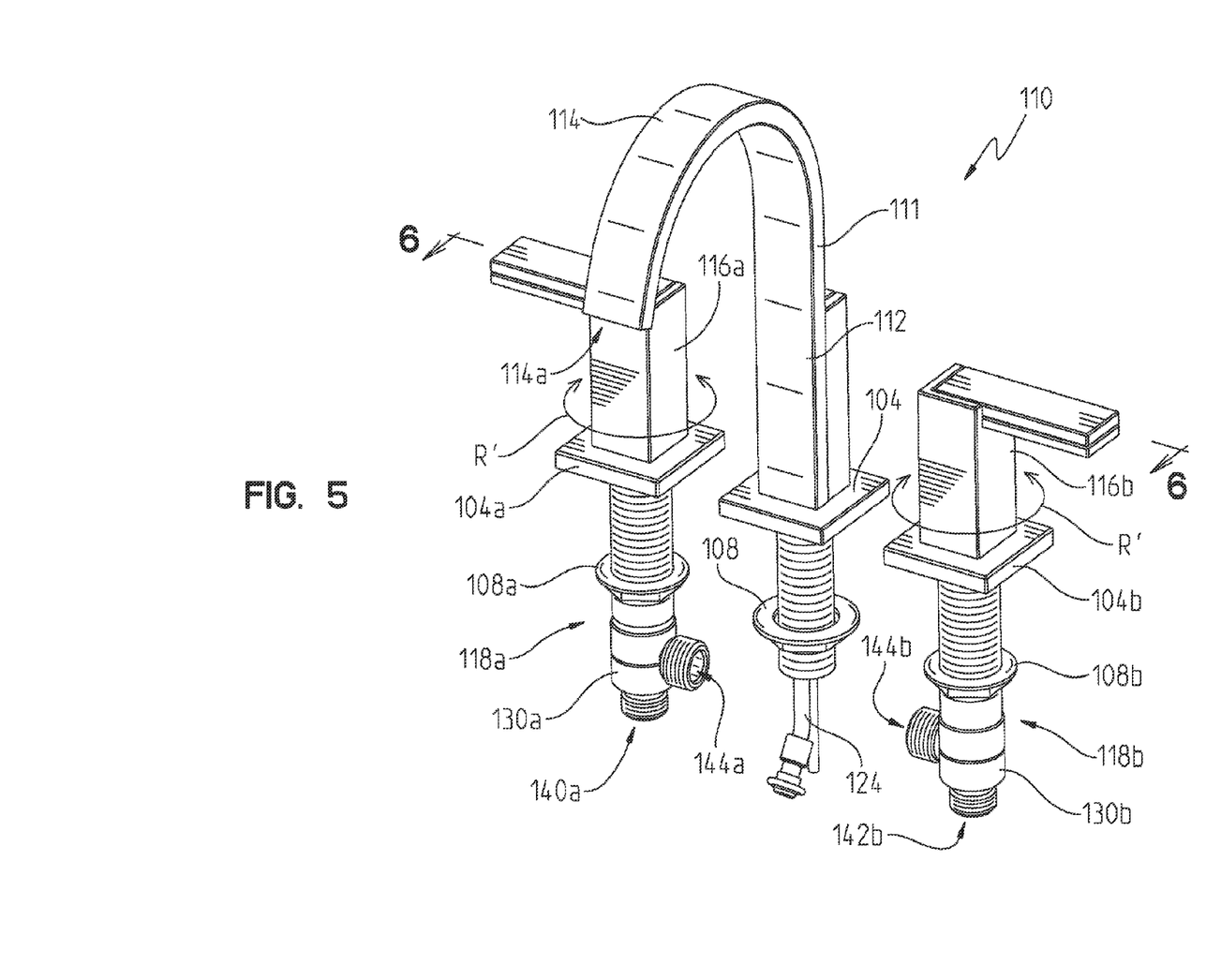
FIG. 5 is a perspective view of another illustrative embodiment faucet of the present disclosure, the faucet including a body having a base and a spout, two handles, and two valve assemblies.
Figure 6:
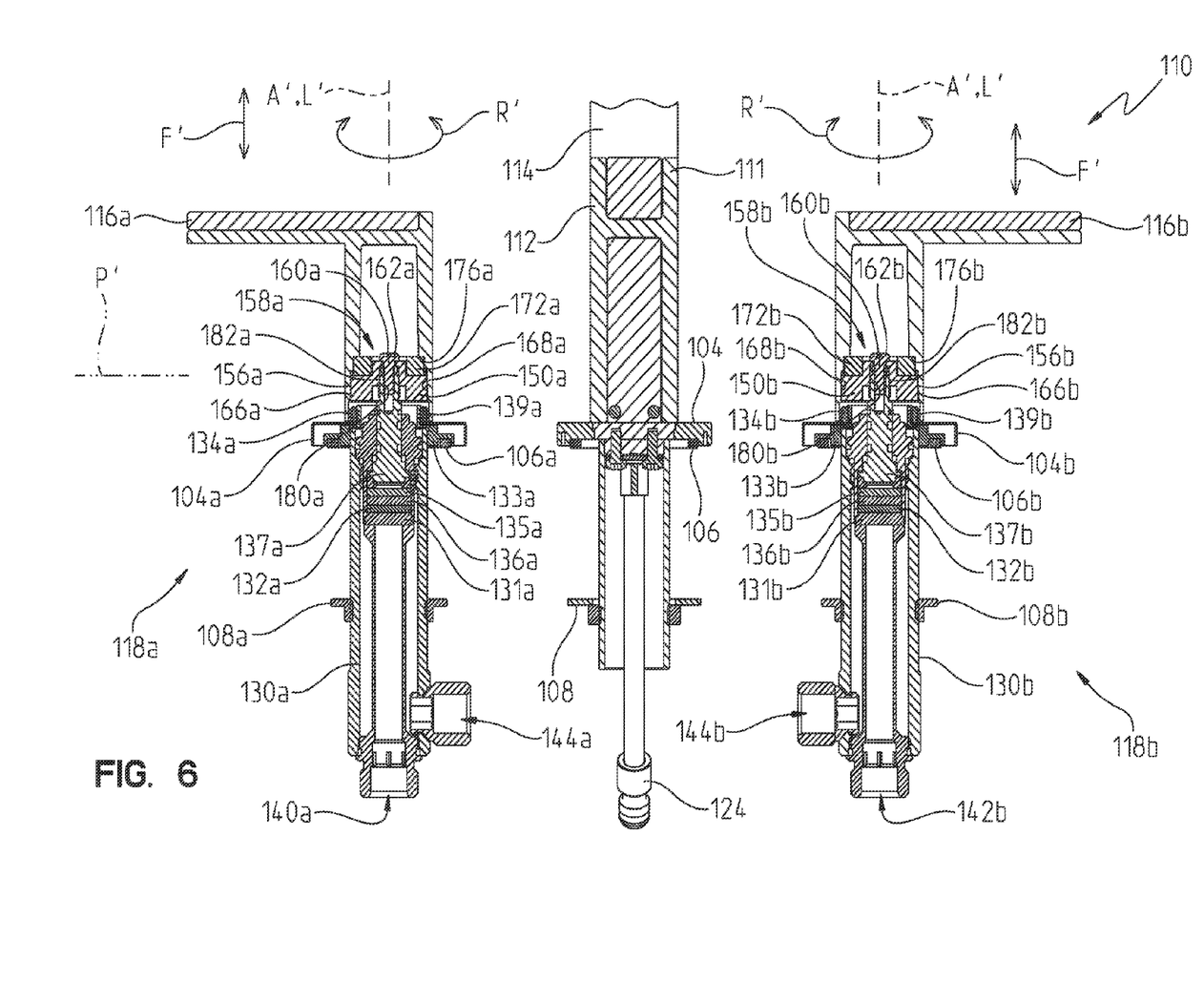
FIG. 6 is a cross-sectional view of a portion of the faucet of FIG. 5, taken along line 6-6 of FIG. 5.
Figure 7:
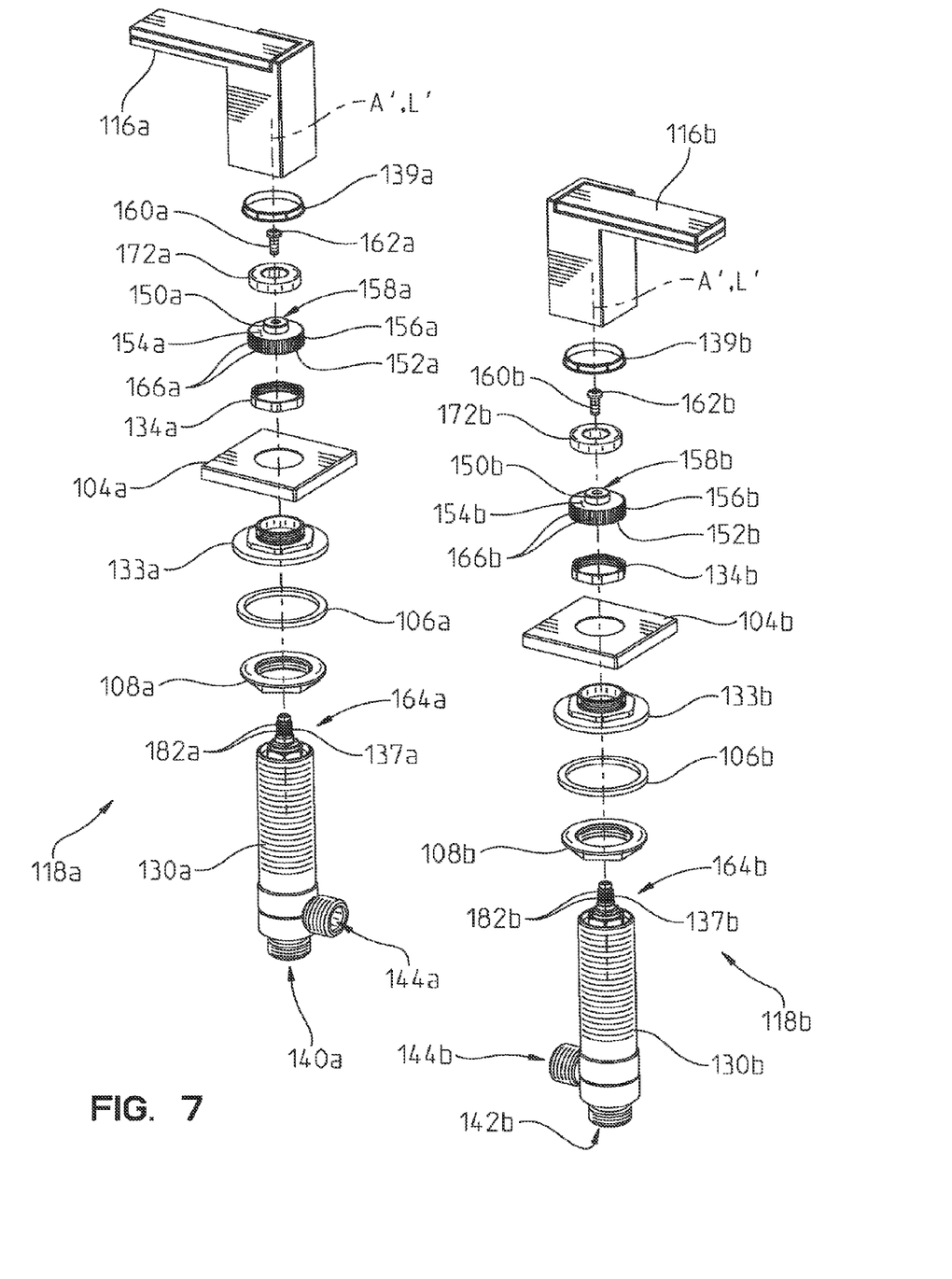
FIG. 7 is an exploded perspective view of the handles and the valve assemblies of the faucet of FIG. 5.

With reference to FIGS. 5-7, another illustrative embodiment faucet 110 is provided. Faucet 110 of FIGS. 5-7 includes certain features similar to faucet 10 of FIGS. 1-4, with like numerals indicating like elements. Faucet 110 illustratively includes body 111 having base 112 and spout 114. Faucet 110 also includes hot and cold handles 116a, 116b, and hot and cold valve assemblies 118a, 118b. Faucet 110 is configured to fluidly couple to hot and cold water supplies (not shown). To couple faucet 110 to a horizontal surface, such as a sink deck (not shown) or a tub deck (not shown), the illustrative faucet 110 includes a plurality of escutcheons 104, 104a, 104b, and seals 106, 106a, 106b, that rest atop the sink deck and a plurality of mounting nuts 108, 108a, 108b, that rest beneath the sink deck, as shown in FIG. 6.

In operation, a user manipulates handles 116a, 116b, of faucet 110 to select a desired fluid temperature and fluid flow rate. Faucet 110 receives hot and cold water streams from the hot and cold water supplies, valve assemblies 118a, 118b, of faucet 110 provide hot and cold water streams to base 112 for mixing based on the position of each handle 116a, 116b, and spout 114 of faucet 110 delivers an outlet water stream into a sink basin (not shown) or a tub (not shown), for example.

As shown in FIGS. 6 and 7, each valve assembly 118a, 118b, of the illustrative faucet 110 includes valve body 130a, 130b, base 131a, 131b, gasket 132a, 132b, a first, externally threaded nut 133a, 133b, and a second, internally threaded nut 134a, 134b. To secure each valve assembly 118a, 118b, in place, first nuts 133a, 133b, surround and engage valve bodies 130a, 130b, and second nuts 134a, 134b, surround and threadably engage first nuts 133a, 133b, as shown in FIG. 6. Second nuts 134a, 134b, rest above escutcheons 104a, 104b, to hold valve assemblies 118a, 118b, in place relative to the sink deck (not shown). Each valve assembly 118a, 118b, may also include an optional spacer ring 139a, 139b, that rests between the corresponding handle 116a, 116b, and second nut 134a, 134b, to maintain a desired position between handles 116a, 116b, and valve assemblies 118a, 118b.

Each valve assembly 118a, 118b, of the illustrative faucet 110 also includes a moveable valve member, illustratively moveable disc 135a, 135b, and a stationary valve member, illustratively stationary disc 136a, 136b. It is also within the scope of the present disclosure that the moveable valve member may include a moveable ball or another suitable component that moves relative to the stationary valve member to control the flow of fluid through each valve assembly 118a, 118b. Each valve assembly 118a, 118b, also includes stem 137a, 137b, that is operably coupled to the corresponding moveable disc 135a, 135b.

Referring still to FIG. 6, hot valve assembly 118a of the illustrative faucet 110 further includes hot water inlet port 140a and hot water outlet port 144a, and cold valve assembly 118b of the illustrative faucet 110 further includes cold water inlet port 142b and cold water outlet port 144b. Hot water inlet port 140a is in fluid communication with the hot water supply (not shown) and cold water inlet port 142b is in fluid communication with the cold water supply (not shown).

Handles 116a, 116b, of the illustrative faucet 110 are coupled to stems 137a, 137b, of valve assemblies 118a, 118b, for movement therewith. As shown in FIG. 6, handles 116a, 116b, may be configured to rotate stems 137a, 137b, about an axis in the direction of arrows R'. In use, moving each handle 116a, 116b, of faucet 110 actuates the corresponding stem 137a, 137b, which then moves the corresponding moveable disc 135a, 135b, relative to stationary disc 136a, 136b, to control the mixing of hot and cold water and the flow rate of water through each valve assembly 118a, 118b. Therefore, by adjusting handles 116a, 116b, of faucet 110, a user is able to selectively vary the flow rate of water supplied from hot and cold water inlet ports 140a, 142b, to hot and cold water outlet ports 144a, 144b, of valve assemblies 118a, 118b. Because outlet ports 144a, 144b, of valve assemblies 118a, 118b, are in fluid communication with outlet waterway 124 of base 112, and because waterway 124 of base 112 is in fluid communication with outlet end 114a of spout 114 (FIG. 5), adjusting handles 116a, 116b, of faucet 110 allows the user to selectively vary the temperature and flow rate of water dispensed form outlet end 114a of spout 114.

According to an exemplary embodiment of the present disclosure, handles 116a, 116b, are removably coupled to stems 137a, 137b, of valve assemblies 118a, 118b. Handles 116a, 116b, may be removed from valve assemblies 118a, 118b, to adjust, clean, replace, or repair the components, for example. The following paragraphs may refer only to handle 116a and valve assembly 118a, but identical or substantially similar components may be used to removably couple handle 116b to valve assembly 118b.

With reference to FIGS. 6 and 7, the illustrative faucet 110 includes bracket 150a to removably couple handle 116a to stem 137a of valve assembly 118a. Bracket 150a may include first surface 152a that faces valve assembly 118a, second surface 154a that faces handle 116a, and a circular-shaped outer periphery 156a.

Bracket 150a includes central aperture 158a that is sized and shaped to receive stem 137a of valve assembly 118a. Like bracket 50 of FIGS. 1-4, bracket 150a may be prevented from spinning freely relative to stem 137a. For example, central aperture 158a of bracket 150a may be non-circular in shape to receive stem 137a of a corresponding shape, or central aperture 158a of bracket 150a may include a plurality of internal, radially spaced ridges 180a that are sized to receive corresponding, radially spaced protrusions 182a that extend from stem 137a.

Bracket 150a itself may be removably coupled to valve assembly 118a. For example, in the illustrative embodiment of FIGS. 6 and 7, bracket 150a is removably coupled to stem 137a of valve assembly 118a using screw 160a. With head 162a of screw 160a resting against second surface 154a of bracket 150a, screw 160a extends through central aperture 158a of bracket 150a and into an internally threaded bore 164a of stem 137a to secure bracket 150a onto stem 137a. Because the illustrative bracket 150a is coupled to stem 137a of valve assembly 118a for movement therewith, bracket 150a should be spaced a sufficient distance from second nut 134a to avoid interfering with movement of stem 137a.

As shown in FIGS. 6 and 7, bracket 150a includes a plurality of radially spaced rails 166a that project from outer periphery 156a. Handle 116a defines corresponding, internal grooves 168a that are configured to receive rails 166a. With handle 116a fully seated onto bracket 150a, handle 116a may be prevented from moving relative to stem 137a of valve assembly 118a, except along axis A'. Thus, handle 116a may be removed from valve assembly 118a by pulling handle 116a upward along axis A'. According to an exemplary embodiment of the present disclosure, when handle 116a is attached to bracket 150a, bracket 150a prevents handle 116a from moving relative to stem 137a under the force of gravity to reduce the likelihood that handle 116a will unintentionally detach from stem 137a.

To further secure handle 116a onto stem 137a of valve assembly 118a, the illustrative faucet 110 includes at least one magnet and at least one magnetically attractive element. In use, the at least one magnet attracts the at least one magnetically attractive element to couple handle 116a to stem 137a of valve assembly 118a for movement therewith.

Unlike faucet 10 which includes first and second magnets 70, 72, the illustrative faucet 110 of FIGS. 6 and 7 includes only a single magnet 172a per handle 116a. Magnet 172a is coupled to handle 116a, and more specifically to shoulder 176a of handle 116a, as shown in FIG. 6. Magnet 172a may be secured against shoulder 176a of handle 116a using a fastener or adhesive, for example. Magnet 172a may be substantially similar to magnets 70, 72, described above with respect to FIGS. 1-4. For example, magnet 172a may generate a magnetic coupling force of approximately 10 $lb_f$, 20 $lb_f$, 30 $lb_f$, or more.

In the illustrative embodiment of FIGS. 6 and 7, bracket 150a itself serves as the magnetically attractive element. In other words, bracket 150a is formed of a material that is attracted to magnet 172a. For example, bracket 150a may be formed of iron or steel, such as 410 stainless steel or galvanized steel. Although this embodiment is described as having only a single magnet 172a, it is within the scope of the present disclosure that bracket 150a itself may comprise a magnet.

When magnet 172a on handle 116a is positioned proximate to bracket 150a on stem 137a of valve assembly 118a, as shown in FIG. 6, magnet 172a attracts bracket 150a to magnetically couple handle 116a to stem 137a for movement therewith. In an illustrative embodiment, magnet 172a and bracket 150a have an axially facing arrangement. For example, as shown in FIG. 6, magnet 172a and bracket 150a interface along plane P' that is oriented substantially perpendicular to longitudinal axis L' of stem 137a. In this illustrative embodiment, magnetic coupling force F' between magnet 172a and bracket 150a is oriented in a direction parallel to longitudinal axis L' of stem 137a, as shown in FIG. 6.

According to an exemplary embodiment of the present disclosure, the magnetic coupling between magnet 172a and bracket 150a generates a total coupling force of approximately 10 $lb_f$, 20 $lb_f$, 30 $lb_f$, or more. The coupling force should be strong enough to hold handle 116a in place during normal operation of faucet 110. However, the coupling force should be weak enough to allow a user to overcome the force and remove handle 116a from faucet 110 when desired, such as when handle 116a needs to be repaired or replaced. Magnet 172a may be positioned in direct contact with bracket 150a, as shown in FIG. 6, to generate a sufficient coupling force.

In the illustrated embodiment of FIGS. 6 and 7, bracket 150a and magnet 172a cooperate both mechanically and magnetically to retain handle 116a in place on stem 137a of valve assembly 118a during normal operation of faucet 110. As discussed above, rails 166a of bracket 150a are received within corresponding grooves 168a of handle 116a to prevent handle 116a from moving relative to stem 137a, except along axis A'. Furthermore, the magnetic coupling force between magnet 172a and bracket 150a resists movement of handle 116a relative to stem 137a, even along axis A'.

When the user chooses to remove handle 116a from stem 137a, the user may pull handle 116a upward along axis A' with enough force to overcome the magnetic coupling force between magnet 172a and bracket 150a. When the user chooses to replace handle 116a, the user may push handle 116a downward along axis A' until handle 116a is fully seated onto bracket 150a and magnet 172a reconnects with bracket 150a. Advantageously, these steps of removing and replacing handle 116a may be completed without the use of tools.

The illustrative faucet 110 of FIG. 5 achieves an attractive exterior appearance that lacks visible fasteners for securing handles 116a, 116b, onto stems 137a, 137b, of valve assemblies 118a, 118b. Rather, brackets 150a, 150b, and magnets 172a, 172b, of the illustrative faucet 110 are interior components that are hidden from view (see FIG. 6).

Although the invention has been described in detail with reference to certain preferred embodiments, variations and modifications exist within the spirit and scope of the invention as described and defined in the following claims.

The invention claimed is:

1. A fluid delivery device including:
a body including at least one waterway;
a valve assembly in fluid communication with the at least one waterway, the valve assembly including:
a movable valve member configured to control the flow of water through the at least one waterway; and
a stem operably coupled to the moveable valve member for movement therewith, the stem having a longitudinal axis;
a handle operably coupled to the stem for movement therewith, wherein the handle is limited to sliding movement relative to the stem along an axis that extends substantially perpendicular to the longitudinal axis of the stem;
a magnetically attractive element supported by one of the handle and the stem; and
at least one magnet supported by the other of the handle and the stem that is configured to magnetically attract the magnetically attractive element to couple the handle to the stem, the at least one magnet interfacing the magnetically attractive element along an interface plane that extends substantially perpendicular to the longitudinal axis of the stem.

2. The fluid delivery device of claim 1, wherein the at least one magnet is a rare earth magnet.

3. The fluid delivery device of claim 1, wherein the at least one magnet includes a protective coating to resist corrosion.

4. The fluid delivery device of claim 3, wherein the protective coating comprises a polymeric overmold.

5. The fluid delivery device of claim 3, wherein the protective coating includes a first nickel layer, a copper layer on top of the first nickel layer, a second nickel layer on top of the copper layer, and an epoxy layer on top of the second nickel layer.

6. The fluid delivery device of claim 1, wherein the magnetically attractive element is comprised of at least one of iron and steel.

7. The fluid delivery device of claim 1, wherein the handle is removable from the stem along a separation axis that extends substantially parallel to the interface plane of the at least one magnet and the magnetically attractive element.

8. The fluid delivery device of claim 1, further comprising a bracket coupled to the stem.

9. The fluid delivery device of claim 8, wherein the bracket is the magnetically attractive element.

10. The fluid delivery device of claim 8, wherein the bracket is a second magnet.

11. The fluid delivery device of claim 8, wherein the bracket defines a chamber for holding the magnetically attractive element, the magnetically attractive element including a second magnet.

12. The fluid delivery device of claim 8, wherein the bracket includes at least one protrusion and the handle includes at least one recess sized to receive the at least one protrusion of the bracket to support the handle on the stem.

13. A fluid delivery device including:
a body including at least one waterway;
a valve assembly in fluid communication with the at least one waterway, the valve assembly including:
a movable valve member configured to control the flow of water through the at least one waterway; and
a stem operably coupled to the moveable valve member for movement therewith, the stem having a longitudinal axis; and
a handle operably coupled to the stem for movement therewith under a magnetic coupling force, the handle oriented in a direction substantially parallel to the longitudinal axis of the stem, wherein the handle is removable from the stem along a separation axis that extends substantially perpendicular to the magnetic coupling force.

14. The fluid delivery device of claim 13, wherein the handle is supported by the body.

15. The fluid delivery device of claim 13, wherein the body rests atop a horizontal surface.

16. The fluid delivery device of claim 13, further including:
a magnetically attractive element supported by one of the handle and the stem; and
at least one magnet supported by the other of the handle and the stem that is configured to magnetically attract the magnetically attractive element to magnetically couple the handle to the stem.

17. The fluid delivery device of claim 13, wherein the magnetic coupling force is between approximately 10 $lb_f$ and 30 $lb_f$.

18. The fluid deliver device of claim 13, further comprising a bracket coupled to the stem.

19. The fluid delivery device of claim 18, wherein the bracket includes at least one protrusion and the handle includes at least one recess sized to receive the at least one protrusion of the bracket to support the handle on the stem.

20. A method of adjusting a fluid delivery device, the method including the steps of:
providing a fluid delivery device including:
a body having at least one waterway;
a handle including a recess;
a valve assembly in fluid communication with the at least one waterway, the valve assembly including a moveable valve member and a stem operably coupled to the moveable valve member and to the handle for movement therewith; and a bracket coupled to the stem and including at least one protrusion sized to be received within recess of the handle to support the handle on the stem;

adjusting the handle to move the stem, the stem actuating the moveable valve member to control the flow of water through the at least one waterway; and removing the handle from the stem by sliding the handle in a direction substantially perpendicular to a longitudinal axis of the stem with sufficient force to overcome a magnetic coupling force between the handle and the stem.

21. The method of claim 20, wherein the adjusting step comprises pivoting the handle about more than one axis.

22. The method of claim 20, further including the step of replacing the handle by sliding the handle in an opposite direction until the handle magnetically couples to the stem.

* * * * *